UNITED STATES PATENT OFFICE.

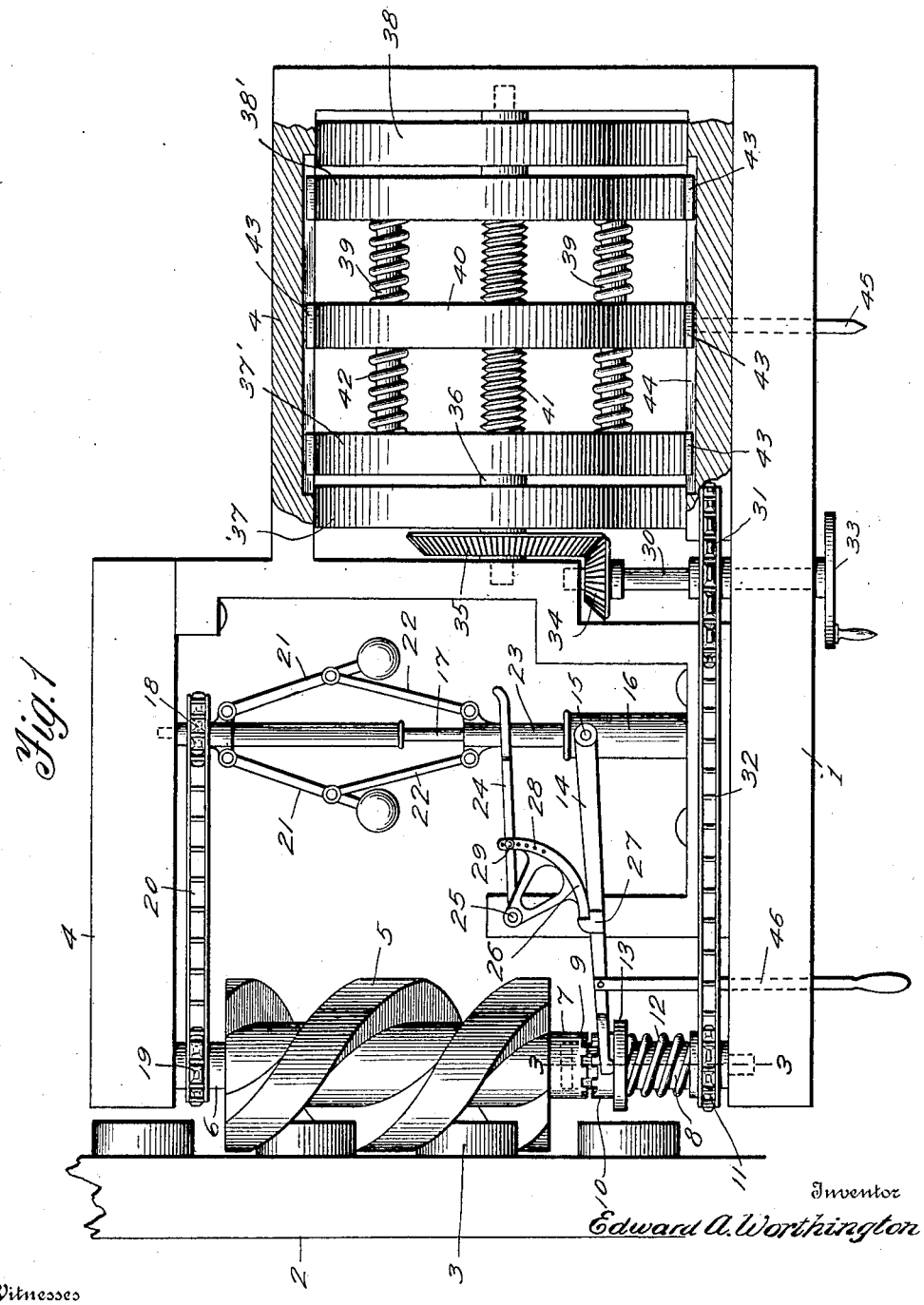

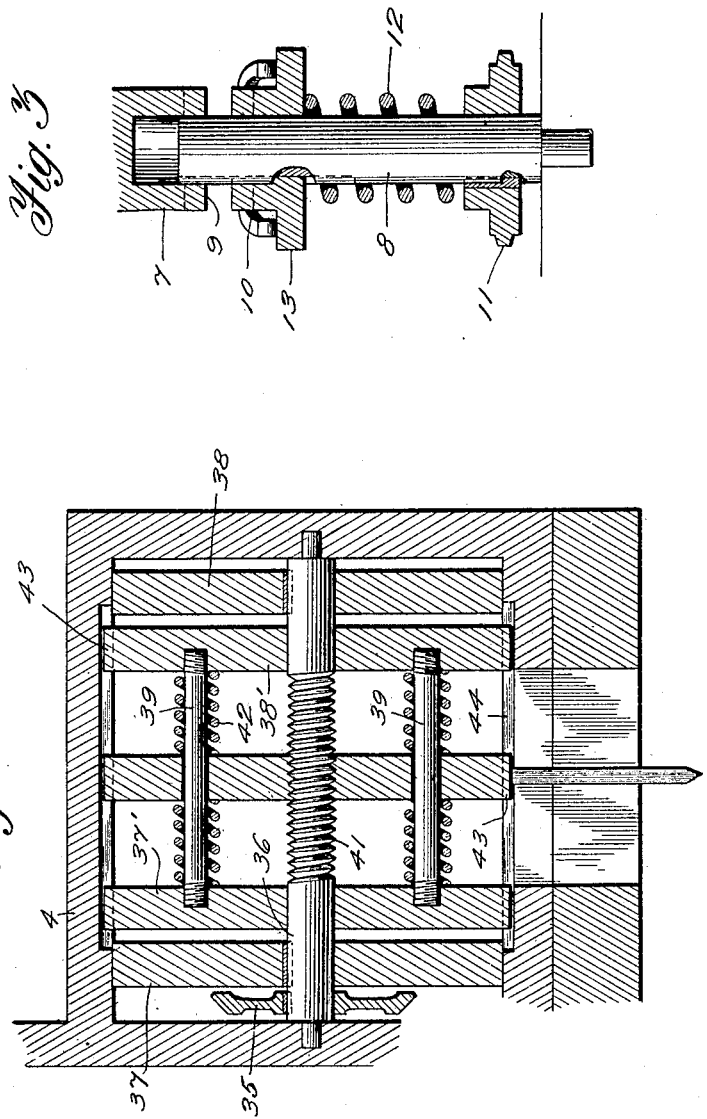

EDWARD A. WORTHINGTON, OF LINCOLN, NEBRASKA.

SAFETY-BRAKE FOR ELEVATORS.

No. 885,560.  Specification of Letters Patent.  Patented April 21, 1908.

Application filed January 30, 1907. Serial No. 354,878.

*To all whom it may concern:*

Be it known that I, EDWARD A. WORTHINGTON, a citizen of the United States of America, residing at Lincoln, in the county of Lancaster and State of Nebraska, have invented new and useful Improvements in Safety-Brakes for Elevators, of which the following is a specification.

This invention relates to safety brakes designed for use in connection with elevators, hoists and lifts for automatically arresting the downward motion of the car and bringing the same to a gradual and complete stop in the event of accidents, such as the breaking of the hoisting rope or cable.

The main object of the invention is to provide a safety brake mechanism which will be automatically thrown into operation when the car starts to move downward by gravity at a speed in excess of the established maximum speed to stop the descent of the car, and to perform its operation without objectionable jerks or jars promptly before the car acquires much momentum.

A further object is to provide an improved type of safety brake mechanism whereby the speed of the car in either direction will be indicated and controlled, which will be easily and yet quickly set into operation when the maximum speed is exceeded, and which may be reset in a convenient manner to restore the parts to normal condition.

In the accompanying drawings,—Figure 1 is a view in elevation, partly in section, of the top of an elevator car equipped with my invention, showing the parts in normal position. Fig. 2 is a vertical longitudinal section through the friction brake gearing for stopping the revoluble brake element. Fig. 3 is a detail section on line 3—3 of Fig. 1.

In the drawings, 1 represents the top of an elevator car, 2 a bar vertically arranged in the elevator shaft and provided with rack teeth 3, and 4 a frame arranged upon the top of the car to support the brake mechanism.

The bar 2 and its teeth 3 constitute a stationary brake member, with which coöperates a revoluble brake member 5, comprising a worm meshing with said teeth. The worm is provided at its upper end with a journal 6 having bearing in the upper end of the frame 4 and at its lower end with a journal 7, which is chambered to receive the upper end of a shaft 8 journaled at its lower end in the car roof 1. The journal 7 turns upon the shaft 8 which is normally stationary and is provided with teeth 9 to form a relatively stationary clutch member for coöperation with a movable clutch member 10 feathered to slide on and rotate with the shaft 8.

A sprocket wheel 11 is fixed on the shaft 8, and surrounding said shaft between said wheel and the clutch member 10 is a coiled spring 12 which tends to throw said clutch member into engagement with the clutch member 9. The clutch member 10 is formed with a flange 13 and is engaged by the yoked outer or free end of a clutch-controlling lever 14, which, in the normal operation of the parts, bears upon said flange and holds the member 10 out of engagement with the member 9.

The lever 14 is pivoted at 15 to a bearing 16 in which is journaled the lower end of a centrifugal governor shaft or stem 17, journaled at its upper end in the top of the frame 4, which shaft carries a sprocket wheel 18 connected with a sprocket wheel 19 on the journal 6 by a chain 20, whereby the governor is continuously driven by the worm 5 during the motion of the car. The governor is provided with the usual weighted arms 21 connected by links 22 to a sliding sleeve 23 operatively connected with one end of a latch controlling lever 24, the opposite end of which is pivoted at 25 to an extension from the frame 4. On the pivot 25 is also pivotally mounted at its vertex portion a segmental latch 26, one end of the curved rim of which forms a locking member to engage a locking shoulder 27 on the lever 14, while the opposite end of said rim is formed with a series of openings 28 for adjustable connection with the lever 24 through the medium of a bolt or other suitable fastening 29, whereby said latch may be adjusted for engagement with the shoulder 27 to hold the lever 14 down against the pressure of the spring 12 to regulate the distance of clutch member 10 from clutch member 9 to vary the time interval of throwing said clutch members into engagement, thus regulating the quickness of action of the brake mechanism.

A vertical power transmitting shaft 30 is journaled in the frame and roof 1 and carries a sprocket wheel 31 connected with sprocket wheel 11 by a chain 32. The lower end of said shaft 30 is provided with a crank wheel 33 by which the operator from within the car may reset or return the parts of the brake mechanism to normal position, as hereinafter described. On the upper end of shaft 30 is a beveled pinion 34 meshing with a beveled gear 35 on a horizontal shaft 36. Keyed on said shaft are stationary brake disks or wheels 37 and 38 which coöperate with interposed relatively movable or slidable brake disks or wheels 37' and 38' connected for movement in unison by rods or bolts 39, the opposing faces of said wheels being trued for an effective frictional engagement. The disks 37' and 38' are formed with axial openings for the passage of the shaft 36, and are adapted to receive motion from the shaft through an interposed wheel or disk 40, slidably engaging the rods or bolts 39 and having a central screw-threaded opening engaging the threaded portion 41 of said shaft, whereby reverse movements of the shaft will move the disk 40 in one direction or the other, the said disk thus operating in the nature of a traveling nut to communicate motion to the traveling brake disks. Surrounding the bolts or rods 39 between the opposite sides of the disk 40 and the respective brake disks 37' and 38' are coiled cushioning or resistance springs 42. These springs form a yielding connection between the disk or nut 40 and the two movable brake disks by which, when the disk 40 is moved in one direction or the other by the action of the shaft 36, motion will be communicated to the movable disks to throw disk 37' into engagement with disk 37 or disk 38' into engagement with disk 38. When either of said movable disks comes into contact with its coöperating stationary disk the braking pressure of said movable disk will be gradually and yieldingly transmitted to the stationary disk through the resistance of the springs, which must be gradually overcome before the full braking pressure is applied, thus securing a quick and effective braking action without jar or strain on the brake mechanism. The disks 37', 38' and 40 are provided with projections 43 entering grooves 44 in the framework, thus allowing said disks to slide without permitting them to rotate, as will be readily understood. The disk 40 carries a pointer 45 movable in a slot in the framework and top of the car and projecting at its lower end into the latter, so that the operator of the car may at all times determine the position of said disk and the condition of the brake mechanism, whereby if the maximum speed of the car is exceeded and the brake mechanism is thrown into operation the operator, warned by the movement of the pointer, may throw off the power or reduce the speed of the car.

Connected with the lever 14 is a resetting rod 46, which projects downward into the car within convenient reach of the operator, to permit said lever, after operation of the brake mechanism, to be drawn down to retract the clutch member 13 and bring the shoulder 27 in position to be again engaged by the latch 26.

Fig. 1 shows the normal position of the parts, from which it will be apparent that the worm or revoluble brake element 5 will be revolved in one direction or the other as the car moves up or down, and the governor will be continuously operated thereby, the remaining parts of the brake mechanism being inactive during normal conditions. If the hoisting rope should break and the car begin to descend by gravity, as soon as the normal maximum speed is exceeded the lever 24 will be swung up by the action of the governor to retract the latch 26, whereby the clutch member 13 will be thrown into engagement with the clutch member 7, thus connecting shaft 8 with the worm 5 to turn therewith and effecting rotation of the shaft 36 through the intervening gearing. The shaft 36 will be rotated in one direction or the other according to the direction of rotation of the worm 5 in the up or down motion of the car when the gearing is set into operation by the governor by the movement of the car at excess speed under normal conditions or its dropping through the breakage of the hoisting cable. As a result, nut or disk 40 will be moved in one direction or the other to shift the movable brake disks, to bring brake disk 37' into engagement with disk 37 or disk 38' into engagement with disk 38. When the acting braking disks come into engagement gradually through the resisting action of the springs described, the movement of the shaft 36 will be checked until it is brought to a complete stop, whereupon such part of the brake gearing will similarly reduce the speed and stop the motion of the shaft 8 and worm 5, which latter being in mesh with the teeth 3 will, when brought to a state of rest, stop the further movement of the car. It will be apparent that the brake mechanism will thus operate to stop the car promptly without jolts or jars, thus preventing any liability of derangement or breakage of the brake gearing.

The construction of the gearing is such that it will operate when the maximum speed of the car is exceeded either in its up or down movement, thus insuring the safety under all conditions, the operator being enabled by the movement of the pointer 45 when the clutches are thrown into gear to determine the condition of affairs and throw off power or check the speed of the car at once.

By adjusting the latch 26 the speed of operation of the clutch mechanism may be regulated in an obvious manner, and by means of the rod 46 the clutch 10 may be restored to normal position to reset the apparatus, as hereinbefore described.

The advantages of the improved mechanism will be readily understood and appreciated and it will be seen that the invention provides a simple and reliable type of brake gear by which danger of accidents in the operation of an elevator or similar contrivance equipped with the invention will be prevented.

Having thus described the invention, what is claimed as new, is:—

1. In an automatic elevator brake, the combination with a car, and a stationary brake element, of a coacting revoluble brake element on the car, a governor operated by the revoluble brake element, brake mechanism, gearing including clutch mechanism for connecting said brake mechanism with the revoluble brake element, and means controlled by the governor for throwing the clutch mechanism into action.

2. In an automatic elevator brake, the combination of a car, and a stationary brake element, of a revoluble brake element on the car, a governor operated by the movement of the revoluble brake element, brake mechanism including a screw shaft and brake devices operated thereby, gearing for driving the shaft, clutch mechanism for connecting said gearing with the revoluble brake element, and means controlled by the governor for holding the clutch mechanism out of action and throwing the same into action.

3. In an automatic elevator brake, the combination with a car, and a stationary brake element, of a revoluble brake element on the car, a governor operated by the revoluble brake element, friction brake mechanism, a screw shaft for operating said brake mechanism, gearing for driving said shaft from the revoluble brake element, clutch gearing for connecting said gearing with the revoluble brake element, and means for normally holding said clutch gearing out of action, said means being controlled by the governor and adapted to be thrown into action thereby.

4. In an automatic brake for elevators, the combination with a car, and a stationary brake element, of a revoluble brake element on the car, a governor driven by the revoluble brake element, friction brake mechanism, a screw shaft for operating the same, means for yieldingly opposing a resistance to the action of the brake mechanism, gearing for driving the shaft from the revoluble brake element, and a clutch controlled by the governor for throwing said gearing into connection with the revoluble brake element.

5. In an automatic brake for elevators, the combination with a car, and a stationary brake element, of a revoluble brake element on the car, a governor operated by the revoluble brake element, stationary friction disks, movable friction disks to engage the same, means including a screw shaft for operating the movable disks, gearing for driving the movable disks from the revoluble brake element, and means controlled by the governor for throwing said gearing into action.

6. In an automatic brake for elevators, the combination with a car, and a stationary brake element, of a revoluble brake element on the car, a governor driven by said revoluble brake element, a screw shaft, brake disks fixed thereto, connected movable brake disks to engage said fixed brake disks, a gear nut operated by the screw shaft to operate the movable brake disks, gearing for driving the screw shaft, and means controlled by the governor for throwing said gearing into connection with the revoluble brake element.

7. In an automatic brake for elevators, the combination with a car, and a stationary brake element, of a coöperating revoluble brake element, a governor driven by the revoluble brake element, a drive shaft, a brake mechanism in gear with and operated by said shaft, coöperating clutch members on the revoluble brake element and shaft, one of said members being spring actuated, a controlling lever for holding the spring actuated clutch member out of action, said lever being provided with a latch element, a second lever controlled and operated by the governor, and an adjustable latch device operated by said second lever and adapted to engage the latch element on the first named lever.

8. In an automatic brake for elevators, a car, a stationary brake member, a coöperating revoluble brake member, a governor driven by the revoluble brake member, a screw shaft, brake disks fixed to the shaft, coöperating sliding brake disks, connections between the sliding disks, a nut arranged between the sliding disks for operation by the shaft, springs between the nut and sliding disks and supported by said connections, gearing for operating the screw shaft from the revoluble brake member, and means controlled by the governor for connecting said gearing with the revoluble brake member.

9. In an automatic brake for elevators, a car, a stationary brake element, a coöperating revoluble brake element on the car, a screw shaft, stationary brake disks carried thereby, slidable brake disks to coöperate therewith, means operated by the shaft for sliding said disks, cushioning means between the sliding disks and operating means, and means controlled by the governor for operating the shaft from the revoluble brake element.

10. In an automatic elevator brake, a stationary brake member, a coacting normally movable brake member on the car, a governor driven by the movable brake element, brake mechanism adapted to be thrown into action by the governor to stop the operation of the movable brake member, said brake mechanism including an operating member, and an indicator actuated by said operating member.

11. In an automatic elevator brake, the combination with a car, and a stationary brake element, of a coacting revoluble brake element on the car in gear with and driven by said stationary brake element, a governor directly driven by the revoluble brake element, brake mechanism controlling the revoluble brake element, gearing connecting said brake mechanism with the revoluble brake element, said gearing being normally inoperative, and means controlled by the governor for rendering said gearing operative.

12. In an automatic brake mechanism, a stationary rack, a worm gear on the car constantly driven by the rack, a governor operated by the worm gear, a brake mechanism for arresting the motion of the worm gear, normally inoperative gearing for driving said mechanism from the worm gear, and means controlled by the governor for rendering said gearing operative.

13. In an automatic brake for elevators, the combination with a car, and a stationary brake element, of a coacting revoluble brake element on the car, a governor operated by said revoluble brake element, gearing normally out of connection with the revoluble brake element, a brake mechanism driven by said gearing, said mechanism including sets of devices for frictional engagement upon reverse movements of the gearing to arrest the movement of the revoluble brake element on either the up or down movement of the car, and means controlled by the governor for throwing said gearing into connection with the revoluble brake element.

14. In an automatic brake for elevators, the combination with a car, and a stationary brake element, of a revoluble brake element on the car, a governor driven by said revoluble brake element, a screw shaft, brake devices, a gear nut operated by the screw shaft to throw said brake devices into and out of action, gearing for driving the screw shaft, means controlled by the governor for throwing said gearing into connection with the revoluble brake element, and an indicator operated by the gear nut.

15. In an automatic brake mechanism for elevators, the combination with a car, and a stationary brake element, of a coacting revoluble brake element, a governor driven by the revoluble brake element, gearing adapted to be driven by the revoluble brake element, means controlled by the governor for throwing said gearing into connection with the revoluble brake element, and a brake mechanism actuated by said gearing for arresting the motion of the revoluble gear element, said gearing comprising stationary braking elements and relatively movable braking elements operative in reverse directions to respectively engage said stationary braking elements, combined with means for opposing a yielding resistance to the movement of said movable braking elements.

In testimony whereof, I affix my signature in presence of two witnesses.

EDWARD A. WORTHINGTON.

Witnesses:
C. H. BARSTOW,
NELL G. ANDERSON.